July 14, 1925.                                                1,546,060
J. P. CARMINE
PHOTOGRAPHIC CAMERA
Filed Feb. 5, 1924
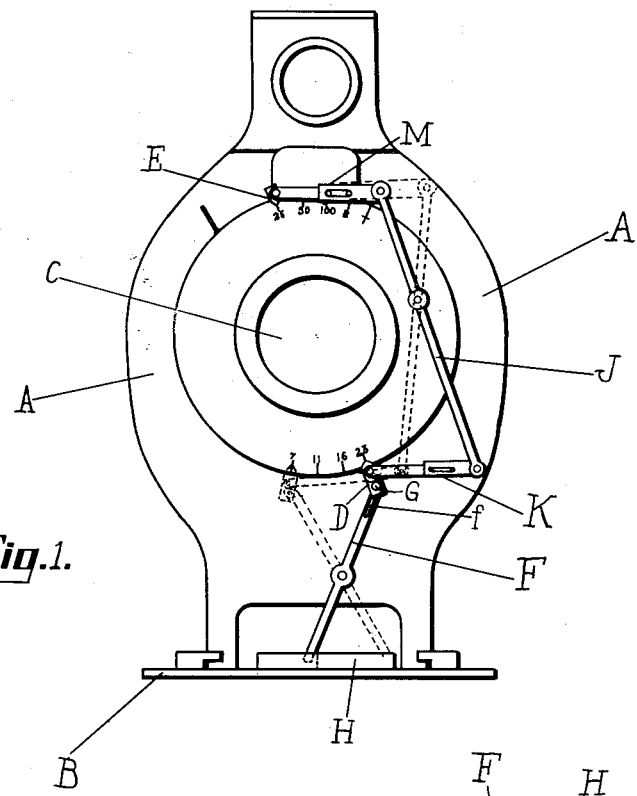
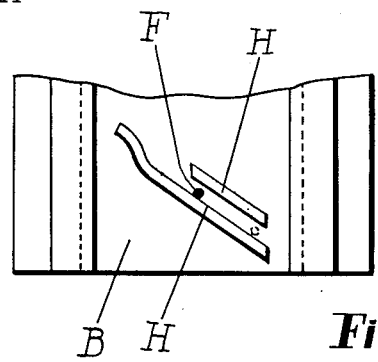
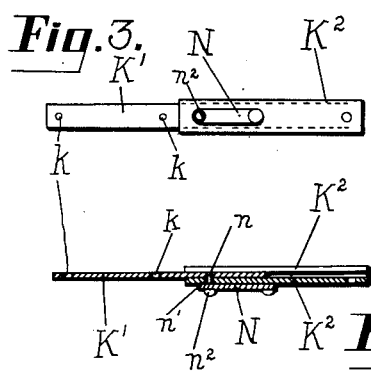
Inventor
Joseph Patrick Carmine
By Emil Bönnelycke
Attorney Patented July 14, 1925.

1,546,060

UNITED STATES PATENT OFFICE.

JOSEPH PATRICK CARMINE, OF WESTPORT, NEW ZEALAND.

PHOTOGRAPHIC CAMERA.

Application filed February 5, 1924. Serial No. 690,872.

*To all whom it may concern:*

Be it known that I, JOSEPH PATRICK CARMINE, a subject of the King of Great Britain, residing at Westport, New Zealand, have invented certain new and useful Improvements in Photographic Cameras, of which the following is a specification.

It is well known that in order to obtain good results in photography, the exposure opening of the camera lens diaphragm requires to be adjusted in accordance with the nature of the subject being photographed, and its distance from the camera, and the exposure period also adjusted in relation to the diaphragm opening.

In cameras, as now constructed, in which provision is made for these respective adjustments, it is necessary to carry out the adjustments by manual manipulation of the operating levers so that, without a thorough knowledge of the working of the camera and of photographic principles, which are quite unknown to the majority of amateurs, no definitely good results can be depended on.

The object of the present invention is to provide for the automatic adjustment of the exposure opening of the diaphragm in correspondence with the movements of the camera lens to the different positions for the focussing of the subjects in the ordinary way, and also to automatically adjust the exposure period in correspondence with the diaphragm opening. For instance, for scenic subjects at infinity focus, it is desirable to reduce the diaphragm to a smaller aperture, and to increase the exposure period, as compared with subjects at a nearer focus and a larger aperture; while for short distance focus, as in portrait work, it is desirable to open the diaphragm to about full aperture and to reduce the exposure period. These relative adjustments of the apertures and exposure times do not, however, always bear a constant ratio, as the prevailing light conditions have to be taken into account. Consequently, in the design of apparatus for the automatic adjustments in correspondence with the focussing of the lens, there must be provision for variations being made to correspond with the light conditions of particular cases.

The invention consists in the combination with a camera having a focussing lens and fitted with a diaphragm exposure opening of the "Iris" type, and with a regulatable time exposure shutter, of means whereby the movements of the lens frame, say from infinity to its shortest focal range, will cause the diaphragm to be automatically opened from small to large aperture, in a gradual manner directly corresponding with the movement of the lens frame, and whereby the reverse movement of such frame will reverse the action of the diaphragm. It also comprises, in combination with these means, connecting means extending between the diaphragm operating lever and the time adjusting operating lever, so constructed and arranged that the movements of the diaphragm lever to open the aperture will move the time lever to its positions by which the exposure period is decreased; and vice versa, the movement of the diaphragm lever to decrease the lens aperture will move the time lever to increase the exposure period. These latter means are designed also to allow for the relative basis of aperture and time being altered to suit brilliant or dull weather, or for summer and winter light conditions.

The exact construction of means employed in carrying out the invention will vary upon cameras of different types, but the invention is particularly adapted to folding cameras of the "snap shot" class having a small range of diaphragm movements and a small variation in exposure periods. It may however be used with other similar types of cameras having greater ranges in these respects.

In all instances, the diaphragm lever is adapted to be moved by the action of levers connected therewith and disposed upon the lens frame so as to be carried with it, and stops or guides fixed upon the lens frame support or standard, with which such connecting levers engage as the lens frame is moved and thus cause the required movements to be imparted to the diaphragm lever. The diaphragm lever is connected with the shutter time lever, by means so constructed and arranged that the motion of the former is conveyed in the desired manner to the latter. The said means are of a nature such that the shutter control lever may be disconnected from the diaphragm lever in order that it may be used independently, and the diaphragm lever may be disconnected from its actuating lever so that it also may be operated independently of the movements of the lens frame.

In the accompanying drawings, I have shown suitable means for giving effect to the invention, such means being merely illustrative, however, of the general principles involved herein. In these drawings:—

Figure 1 is a front elevation of a lens carrier frame and its supporting slide, showing the lens fitted with the invention.

Figure 2 is a plan of portion of the slide.

Figure 3 is a front elevation on an exaggerated scale, of a form of link for use in connecting the diaphragm and shutter levers together.

Figure 4 is a sectional plan thereof.

A represents an ordinary lens frame and B the slide carrier upon which it is mounted to move in and out in the focussing of the lens in the well known manner. C is the lens. D is the ordinary Iris diaphragm operating finger lever and E is the ordinary shutter time adjusting finger lever.

In this invention, according to the means shown, a lever F is provided and pivoted upon the front of the lens frame A beneath the lens so that it is capable of rocking across the face of such frame. The upper end of this lever is attached to the diaphragm lever D in any convenient manner such as to allow for it being readily connected and disconnected at will, as by means of a small screw pin G passing through a slot $f$ in the lever end, such slot being made long enough to permit of the diaphragm lever traveling around the edge of the lens as it is moved by the rocking of the lever F. The lower end of this lever F is carried down to near the surface of the carrier slide B and upon such surface are fixed the parallel guide bars H, shown in Figure 2. These guide bars are fixed at such a distance apart as to permit of the lever end passing freely in between them and are arranged in such a position upon the slide and at such an angle across it, that the lever end will pass in between them as the lens carrier is moved out to its "infinity" position, and then as it is moved out to the position of its shortest focal range, will move the lever F across on its pivot the necessary distance to move the diaphragm lever D from its small aperture to large aperture positions. The inward movement of the lens carrier will cause a reverse action to take place.

A second rocking lever J is pivoted to the lens frame front on one side of the lens so that it extends upward and downwards and turns across the front of the frame. This lever has its lower end connected by the link K with the diaphragm lever D and its upper end connected by a similar link M with the shutter time lever E. The movements of the lever D will thus be communicated to the lever E and the ratio of leverage as between the two ends of the lever J is such that the movement of the lever D from its small aperture position to its large aperture position will move the lever E from its longest time position to its shortest time position, and vice versa.

In order to provide for the movements of the diaphragm and time levers being relatively altered, as for instance to provide for the time lever being moved from a shorter time position than the maximum to the shortest time position, while the diaphragm lever moves through its full movement, and thus to adjust the camera for work in brighter light conditions, each of the links K and M is made adjustable in length and is constructed so that it may be made rigid at either of two lengths.

A construction to provide for this effect is shown in Figures 3 and 4 and it consists in making the link in two members $K'$ and $K^2$, one member $K'$ sliding at one end in behind the face of the other member $K^2$ and having its other end formed to link on to the lever D or E, as the case may be. The other member $K^2$ is adapted to be pivoted at its outer end to the appropriate end of the rocking lever J. A spring plate N is screwed at one of its ends to the outside face of the member $K^2$ and extends along such face with a tension bearing inwards thereon. At its other end it is provided with a pin $n$ projecting inwards and passing through an aperture $n'$ in the member $K^2$. The member $K'$ is then formed with two apertures $k$ at the required distance apart so that the pin may pass into either of these when the two members are moved one on the other to bring the desired aperture into coincidence with the pin, and thereby make the link a rigid length of the required extent to give the adjustment needed. A finger knob $n^2$ is fitted to the outside of the spring N to permit of it being pulled out to free the pin.

By pulling the plate out and turning it slightly on its screw so that the pin $n$ engages a solid part of the member $K^2$, the two parts of the link will be freed so that they may slide one on the other and thereby allow for the respective levers D and E being moved independently and manually in the usual way.

The rocking lever F may also be disconnected from the diaphragm lever D so that its movements will not be conveyed to such lever, and thereby allow for the diaphragm aperture being adjusted independently of the movements of the lens carrier.

Other means for conveying the lens carrier movements to the diaphragm lever and for actuating the rocking lever F by the movements of the carrier on its slide, may be employed without departing from the principles of this invention. I wish it to be understood, therefore, that I do not confine myself exclusively to the means shown in the drawings and herein described for giving effect to the invention.

I claim as my invention:—

1. In a camera having a movable lens frame, a carrier therefor, and diaphragm aperture control mechanism and shutter time control mechanism mounted on the lens frame: the combination of lever means disposed upon the lens frame and connected to the diaphragm control mechanism; means on the carrier to engage and actuate said lever means during the movement of the lens frame and thereby operate said diaphragm control mechanism; and a connection between the diaphragm control mechanism and the time control mechanism for operating the latter from and simultaneously with the former.

2. A camera according to claim 1, in which the connection between the diaphragm control mechanism and the time control mechanism operates the latter inversely to the former, so that the movements of the diaphragm control mechanism to open the aperture will move the time control mechanism to reduce the exposure period, and vice versa.

3. A camera according to claim 1, in which the means for connecting the diaphragm control mechanism and the shutter time control mechanism together comprise a lever pivoted upon the lens frame, a link extending from one end of such lever to the said diaphragm control mechanism, and a link extending from the other end of the lever to the shutter time control mechanism.

4. A camera, according to claim 1, in which the connecting means between the diaphragm control mechanism and the shutter control mechanism comprise a lever pivoted upon the lens frame, a link extending from one end of the lever to the diaphragm control mechanism, and a link extending from the other end of the lever to the shutter control mechanism; each link embodying adjustably-related members to vary the length thereof and having means associated with said members for rigidly connecting them together in predetermined position or for disconnecting them to enable their relative movement to take place without moving the control mechanism with which the link is connected.

5. In a camera, the combination, with the movable lens frame, its carrier, and diaphragm aperture control mechanism and shutter time control mechanism upon the lens frame; of a lever pivoted to said frame and connected at one end to one of the control mechanisms to operate the same; a connection between that control mechanism and the other control mechanism to operate the latter from the former; and means on the carrier for cooperation with the other end of the lever to rock said lever automatically during the movements of the lens frame.

6. In a camera, the combination, with the movable lens frame, its carrier, and diaphragm aperture control mechanism and shutter time control mechanism upon the lens frame; of a lever pivoted to said frame, and connected at one end to one of the control mechanisms to operate the same; a connection between that control mechanism and the other control mechanism to operate the latter from the former; and a guide on the carrier for engagement with the other end of the lever and disposed at an angle to the normal line of movement of said end, whereby the lever will be automatically rocked during the movements of the lens frame.

7. In a camera, the combination, with the movable lens frame, its carrier, and diaphragm aperture control mechanism and shutter time control mechanism upon the lens frame; of a vertical lever pivoted to said frame directly below the lens and having its lower end extending into proximity to the carrier; means on the carrier to displace said lever end from its normal line of movement during the movements of the lens frame, whereby said lever will be caused to rock about its axis; a connection between the upper end of the lever and one of the control mechanisms; and a connection between that control mechanism and the other control mechanism to actuate the latter from the former.

In testimony whereof I affix my signature.

JOSEPH PATRICK CARMINE.